United States Patent
Jackson et al.

(10) Patent No.: US 6,793,053 B2
(45) Date of Patent: Sep. 21, 2004

(54) TORQUE CONVERTER CLUTCH REGULATOR VALVE ASSEMBLY

(75) Inventors: Scott C. Jackson, Chester, VT (US); Robert C. Warnke, Spooner, WI (US)

(73) Assignee: Sonnax Industries, Inc., Bellows Falls, VT (US)

( * ) Notice: Subject to any disclaimer, the term of this patent is extended or adjusted under 35 U.S.C. 154(b) by 61 days.

(21) Appl. No.: 10/394,818

(22) Filed: Mar. 21, 2003

(65) Prior Publication Data

US 2003/0188946 A1 Oct. 9, 2003

Related U.S. Application Data

(60) Provisional application No. 60/369,751, filed on Apr. 5, 2002.

(51) Int. Cl.[7] ............................................... F16B 47/06
(52) U.S. Cl. ..................................................... 192/3.3
(58) Field of Search ............................. 192/3.28, 3.29, 192/33, 3.31; 137/454.2, 625.64

(56) References Cited

U.S. PATENT DOCUMENTS

| | | | |
|---|---|---|---|
| 4,271,939 A | | 6/1981 | Iwanaga et al. ............. 192/3.3 |
| 4,618,036 A | | 10/1986 | Ideta ........................... 192/3.3 |
| 4,907,475 A | * | 3/1990 | Holbrook ...................... 477/134 |
| 5,251,734 A | * | 10/1993 | Benford et al. .............. 192/3.3 |
| 5,722,459 A | * | 3/1998 | Kim et al. ............. 137/625.64 |
| 5,997,437 A | * | 12/1999 | Jang ............................. 477/156 |
| 6,543,472 B2 | * | 4/2003 | Stafford .................... 137/454.2 |
| 6,712,726 B1 | * | 3/2004 | Jackson et al. ............. 475/127 |

* cited by examiner

*Primary Examiner*—Saul Rodriguez
(74) *Attorney, Agent, or Firm*—Clifford F. Rey

(57) ABSTRACT

A replacement torque converter clutch regulator valve assembly for an automatic transmission that controls clutch apply circuit pressure to the lockup piston within the torque converter clutch is disclosed. The present torque converter clutch regulator valve assembly includes an internal pressure relief valve that regulates clutch apply circuit pressure in the range of 90 to 100 pounds per square inch in comparison to the original equipment manufacture line pressure of 130 to 140 pounds per square inch thereby preventing deflection and malfunction of the lockup piston in operation. The present torque converter clutch regulator valve assembly also includes a modified switch valve having a fluid restricting baffle formed thereon that eliminates the initial spike in clutch apply circuit pressure at the start of each apply cycle to the torque converter clutch, which reduces shudder and provides improved control of the clutch apply and release circuits.

16 Claims, 4 Drawing Sheets

TORQUE CONVERTER CLUTCH REGULATOR VALVE ASSEMBLY

CROSS-REFERENCE TO RELATED APPLICATION

This application claims the benefit under 35 U.S.C. §119 (e) of U.S. Provisional Patent Application No. 60/369,751 filed Apr. 5, 2002, entitled Torque Converter Clutch Regulator Valve Assembly.

BACKGROUND OF THE INVENTION

The present invention relates generally to the field of hydraulic circuits within automatic transmission systems for land vehicles and, more particularly, to a Torque Converter Clutch Regulator Valve Assembly (hereinafter "TCCRV Assembly") that directs fluid pressure to apply and/or release the torque converter clutch within the torque converter of the transmission.

The Chrysler 41TE and 42LE transmissions (hereinafter the "Chrysler transmissions") are equipped with mechanisms to "lockup" their torque converters under certain operating conditions. The purpose of the lockup converter is to provide for direct drive when the vehicle is cruising at higher speeds. Since there is always some slippage in the fluid coupling of a torque converter, some power is lost and fuel economy suffers. By providing a direct mechanical coupling through the transmission at high engine speeds, the lockup converter improves fuel economy.

This is accomplished by an electronic/hydraulic torque converter clutch system, which utilizes a lockup piston within the torque converter housing. The lockup piston has friction material on its forward surface. When the vehicle is at cruising speed and lockup is desired, an electric solenoid is energized that strokes the Torque Converter Clutch Switch Valve in the valve body. This opens a port to allow fluid pressure to act upon the lockup piston, which is forced against a machined surface on the converter cover. Thus, the lockup piston and the converter cover are locked together and act as a single unit similar to a manual transmission clutch. Because the lockup piston is mechanically coupled to the transmission input shaft, a direct mechanical link through the torque converter to the drive wheels is established.

When lockup is no longer required, a port opens that allows the pressurized fluid to exhaust. The lockup piston then moves away from the torque converter housing reestablishing the fluid coupling. Lockup in electronic torque converter clutch systems is controlled by the vehicle's computer module. When the computer module senses the engine is warm and the vehicle is traveling at a steady speed of about 40 miles per hour, lockup is initiated. When speed falls below about 40 miles per hour, the brakes are applied, or a lower gear is selected, apply pressure is exhausted to end lockup.

A common service complaint in automotive vehicles employing the aforementioned Chrysler transmissions is the lack of hydraulic control over the torque converter clutch. The torque converter clutch requires both hydraulic flow and pressure matched to engine torque load to prevent slippage, overheating, shudder, deflection and/or breakage of the lockup piston. The original equipment manufacture (hereinafter "OEM") hydraulic control does not adequately limit fluid pressure or control flow to the torque converter clutch piston. Normal operating pressure affecting the torque converter clutch is controlled by the line pressure regulator valve, which feeds the torque converter clutch. During the time the torque converter clutch is not applied, a derivative of line pressure (i.e. cooler/converter pressure) is feeding automatic transmission fluid (hereinafter "ATF") to the release circuit of the converter. Such cooler/converter pressure is generally 50% or less than line pressure.

The inefficiency of the OEM design is particularly evident when the computer module controls torque converter clutch apply using line pressure. The concern is that line pressure can rapidly increase up to 140 pounds per square inch (psi) or more, which causes internal distortion of the torque converter clutch piston.

There are known prior art patents that are available in the field and their discussion follows. One example is U.S. Pat. No. 4,271,939 to Iwanga et al., which discloses a hydraulic control system for a torque converter for ensuring release of the lock-up condition of the torque converter. This is accomplished by providing a flow restrictor in the hydraulic working fluid supply passage for the torque converter to make the flow resistance of the passage equal to or larger than the flow resistance of the hydraulic working fluid supply passage for the lock-up control chamber. In this control system a first or feed passageway communicates with a source of pressurized fluid and with a torque converter chamber, a second or discharge passageway communicates with the torque converter chamber and a third passageway communicates with a lock-up control or clutch chamber of the lockup clutch. A lockup control valve communicates with the same source of pressurized fluid and with the third passageway. The first passageway is provided with the flow restrictor. With the provision of the flow restrictor, the disengagement of the lockup clutch will be assured upon pressurization of the third passageway.

Another example is U.S. Pat. No. 4,618,036 to Ideta, which discloses a hydraulic control system for the lockup clutch of a torque converter wherein release of a lockup clutch is ensured even when the discharge flow rate of the pump is low. This control system comprises a pump driven by an engine to discharge fluid, a torque converter having a lockup clutch with a lockup clutch piston movable to a clutch released position when fluid pressure within a lockup release chamber is higher than fluid pressure within a working chamber in the torque converter cavity, a line pressure regulator valve and an orifice, which provides a restricted flow communication between the torque converter and the pump even when line pressure generated by the line pressure regulator valve is lower than a predetermined value. The Ideta ('036) patent utilizes cutouts 20 formed on the land 32d of the first spool 32 (FIG. 1) on the line pressure regulator valve to permit a sufficient flow of hydraulic fluid via oil conduit 62 to torque converter 10 at low speed operation to ensure the release of the lockup clutch.

The present invention provides advantages over the prior art and is disclosed hereinafter in further detail.

SUMMARY OF THE INVENTION

Accordingly, the present invention is a replacement Torque Converter Clutch Regulator Valve (TCCRV) Assembly for an automatic transmission including an internal pressure relief valve that regulates torque converter clutch apply circuit pressure to the lockup piston in the range of 90–100 psi in comparison to the OEM line pressure of 130 to 140 psi, which prevents deflection and/or breakage of the lockup piston. In addition, the present TCCRV Assembly includes a modified Switch Valve having a fluid restricting baffle formed thereon that delays fluid pressure build up in the clutch apply circuit and prevents the initial spike in clutch apply circuit pressure to the lockup piston within the torque converter clutch providing improved control of the clutch apply and release circuits.

Thus, there has been outlined rather broadly the important features of the present invention in order that the detailed description thereof that follows may be better understood, and in order that the present contribution to the art may be better appreciated. There are additional features of the invention that will be described hereinafter and which will form the subject matter of the claims appended hereto.

Those skilled in the art will appreciate that the conception upon which this disclosure is based may readily be utilized as a basis for the designing of other structures, methods, and systems for carrying out the purposes of the present invention. It is important, therefore, that the claims be regarded as including such equivalent constructions insofar as they do not depart from the spirit and scope of the present invention.

BRIEF DESCRIPTION OF THE DRAWINGS

The novel features of the present invention are set forth in the appended claim. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENT

Figure 1A:
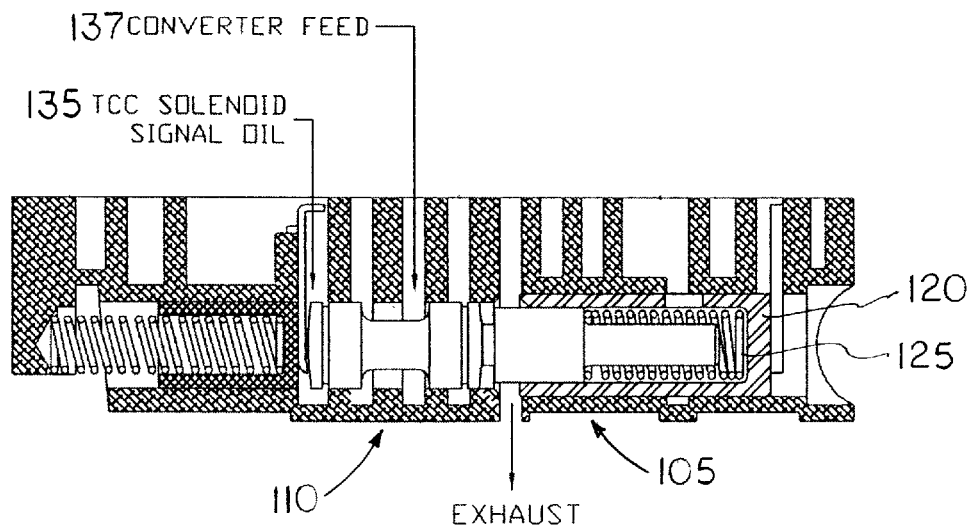
FIG. 1A is a cross-sectional view of a Torque Converter Clutch Regulator Valve (TCCRV) Assembly shown within the valve body of the transmission in the non-lockup position and labeled Prior Art.

Prior to describing the present invention in detail, it may be beneficial to review the structure and function of a TCCRV Assembly of the prior art for purposes of comparison. With reference to the drawings there is shown therein a TCCRV Assembly in accordance with the prior art, indicated generally at 100 and illustrated in FIGS. 1A and 1B. The prior art TCCRV Assembly 100 is comprised of a Bias Valve, indicated generally at 105, a Switch Valve, indicated generally at 110, a Bias Valve Spring 125, and the Bias Valve Sleeve 120.

When the vehicle is at cruising speed and lockup is desired, the TCC solenoid at 135 sends ATF at variable pressure depending on solenoid duty cycle to the Switch Valve 110, which controls the flow of ATF to the TCC apply circuit at 136. As ATF flows into the Switch Valve at 135, the force of spring 120 is overcome and the Switch Valve 110 is stroked (i.e. to the right) to the lockup position shown in FIG. 1B. In this position ATF is released from the converter feed circuit as at 137 to the TCC apply circuit at 136 actuating the lockup piston (not shown). In this mode of operation, the lockup piston and the torque converter cover are locked together establishing a direct mechanical link through the torque converter to the drive wheels.

Figure 1B:
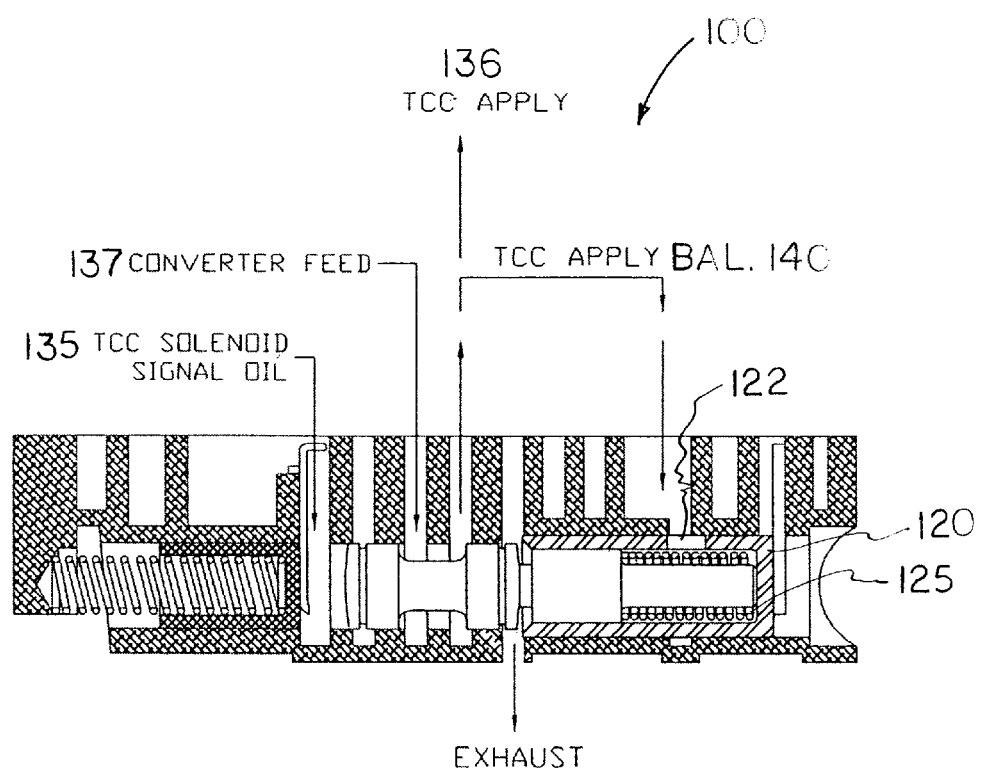
FIG. 1B is a cross-sectional view of the TCCRV Assembly of FIG. 1A shown in the lockup position and labeled Prior Art.

Simultaneously, ATF pressure passes into the TCC apply balance circuit at 140 and is directed through orifice 122 in the Bias Valve Sleeve 120 as shown in FIG. 1B. ATF flow in the TCC apply balance circuit 140 counteracts TCC solenoid pressure on the Bias Valve 105 to assist spring 125 in the return stroke of the TCCRV Assembly 100 when lockup is not desired.

A problem that occurs in vehicles employing the prior art TCCRV Assembly 100 is excessive apply pressure to the torque converter clutch. A sudden increase or spike in fluid pressure within the TCC apply circuit 136 up to 140 psi can occur when the prior art valve is shifted to the position shown in FIG. 1B causing deflection (i.e. lateral movement) of the lockup piston from its normal concentric position within the torque converter cover.

In turn, this causes a chain reaction of failures. The torque converter clutch lining positioned on the inner surface of the converter cover eventually disintegrates as a result of the deflection of the lockup piston. Thereafter, the filter and the radiator become clogged cutting off lubrication, and the planetary gears and/or the entire torque converter overheats. Thus, the present invention has been developed to resolve this problem and will now be described.

Figure 2:
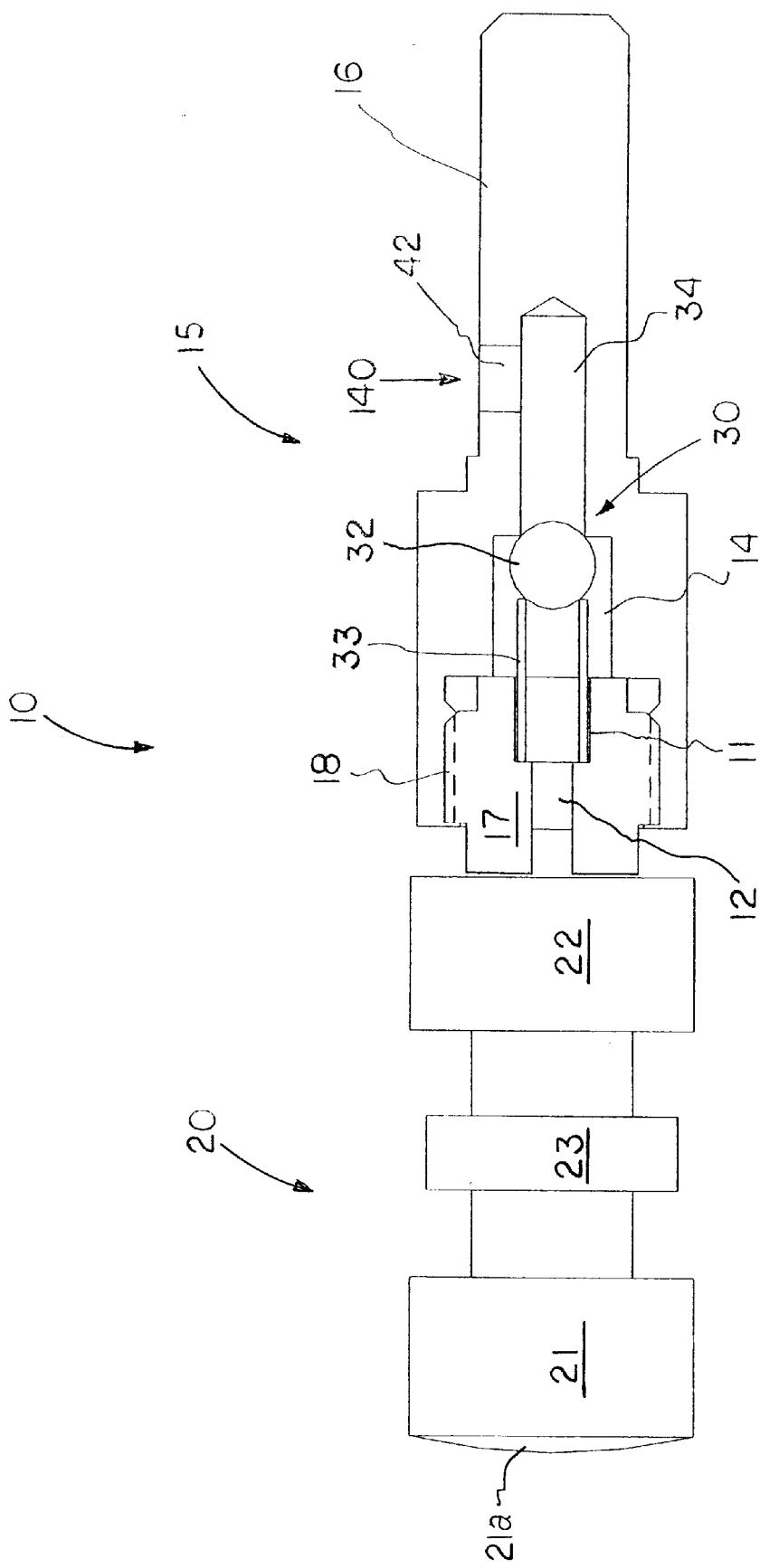
FIG. 2 is a longitudinal cross-section of the Torque Converter Clutch Regulator Valve Assembly of the present invention showing the structural details thereof.

Referring to FIG. 2 there is shown an improved TCCRV Assembly in accordance with the present invention, indicated generally at 10. The present TCCRV Assembly 10 is comprised of a modified Bias Valve, indicated generally at 15, and a modified Switch Valve, indicated generally at 20. It will be noted that the OEM Bias Valve Spring 125 and the OEM Bias Valve Sleeve 120 can be reused, if desired, during a retrofit procedure of the present TCCRV Assembly 10.

The modified Bias Valve 15 includes a valve piston 16 having an internal valve chamber 14 formed therein, which is mechanically coupled to a Bias Valve Cap 17 by mating threads 18. An internal pressure relief valve, indicated generally at 30, including a check ball 32 and check ball spring 33 is permanently captured within the valve chamber 14. The check ball 32 is positioned in opening/closing relation to a fluid passage 34 that is in fluid communication with TCC apply fluid pressure as at 140 via orifice 42. The check ball 32 is biased to the closed position by spring 33. The pressure relief valve 30 functions to reduce apply pressure directed to the lockup piston, which prevents deflection of the lockup piston.

Still referring to FIG. 2 the Bias Valve Cap 17 includes a central bore 12 extending through it in fluid communication with the valve chamber 14. The central bore 12 is counterbored as at 11 to provide a seat for the check ball spring 33.

The present TCCRV Assembly 10 operates in conjunction with a modified Switch Valve 20, which controls ATF flow to the torque converter. It can be seen that the Switch Valve 20 is a spool type valve including control lands 21, 22 formed at opposite ends thereof to direct ATF flow from converter feed circuit at 137, which is derived from line pressure, into the TCC apply circuit at 136. It will be noted that the land 21 includes a convex end face 21a, which provides an optimal reaction surface to ATF entering the valve from the TCC solenoid circuit at 135.

In addition, the Switch Valve 20 includes a baffle 23 fabricated to a predetermined diameter, which partially blocks and slows down the flow of fluid through the valve bore 107 (FIG. 3B) as explained hereinafter in further detail.

Figure 3A:
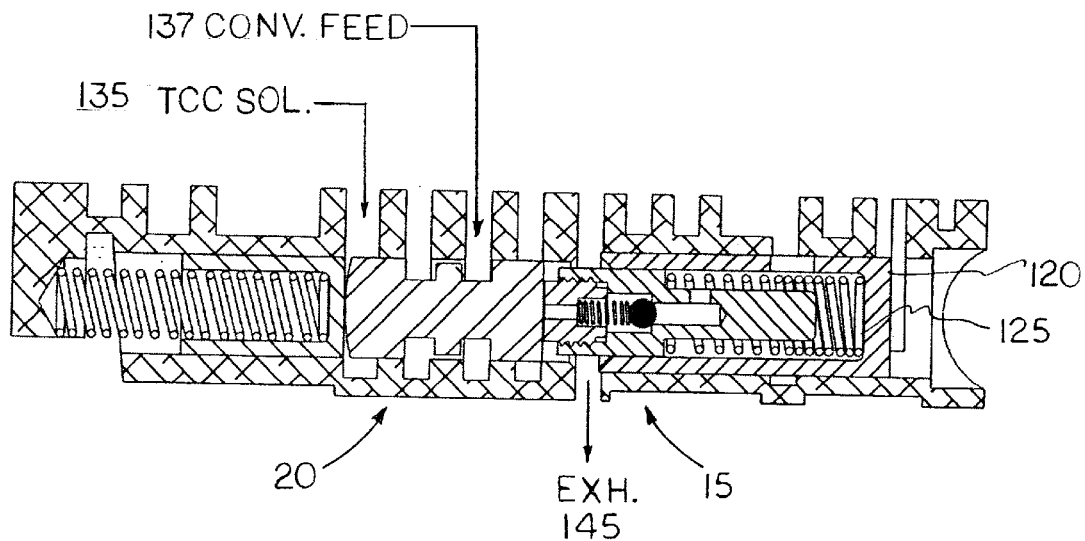
FIG. 3A is a cross-sectional view of the present TCCRV Assembly shown within the valve body of the transmission in the non-lockup position.
Figure 3B:
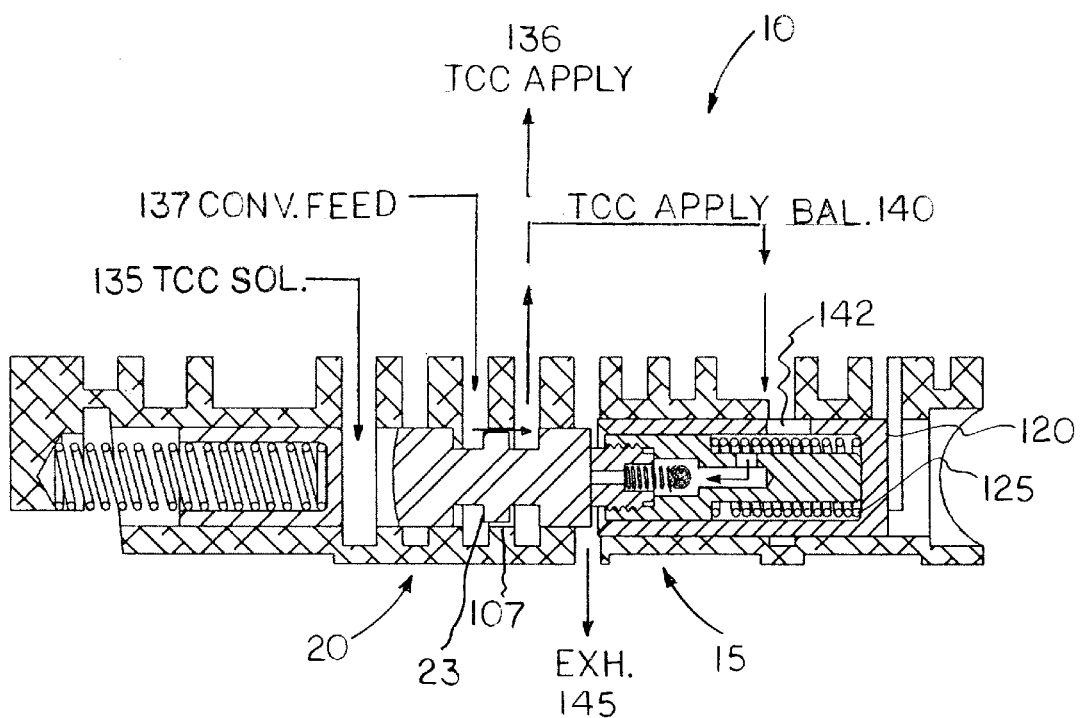
FIG. 3B is a cross-sectional view of the present TCCRV Assembly shown in FIG. 3A in the lockup position.

Referring to FIGS. 3A and 3B the present TCCRV Assembly 10 is shown in its functional position within the valve body 105 in direct replacement of the prior art TCCRV Assembly 100. In operation the TCC solenoid at 135 delivers ATF at variable pressure to the modified Switch Valve 20, which overcomes the force of spring 125 and strokes the present TCCRV Assembly 10 to the lockup position shown in FIG. 3B. In this position the TCC apply circuit at 136 receives ATF at line pressure (i.e. 130 to 140 psi) via converter feed circuit at 137 as shown.

The present Switch Valve 20 includes structures comprising flow restricting means including, but not limited to, the following structures. In the present Switch Valve 20, the baffle 23 formed between lands 21, 22 regulates the flow of ATF to the TCC apply circuit 136 by reducing the cross-sectional area of the bore 107 (FIG. 3B) surrounding the baffle 23 thereby delaying fluid pressure buildup in the apply circuit. Thus, the baffle 23 prevents the initial pressure spike and the associated fluid shock effect in the TCC apply circuit at 136, which occurs in the prior art when ATF at line pressure (i.e. 130 to 140 psi) is delivered into the apply circuit absent the present baffle 23.

The present modified Bias Valve 15 includes structures comprising pressure reducing means including, but not limited to, the following structures. When the Bias Valve 15 is stroked to the lockup position shown in FIG. 3B, ATF is simultaneously delivered to the TCC apply balance circuit 140 at line pressure (i.e. 130 to 140 psi) and enters the orifice 142 in the sleeve 120. In the present invention check ball spring 33 is calibrated to open the check ball 32 at a fluid pressure of 90–100 psi, which reduces fluid pressure in the TCC apply circuit 136 to 90–100 psi simultaneously. Thus, any excess fluid pressure in the TCC apply circuit 136 is diverted to exhaust circuit 145.

It has been determined that in the range of 90–100 psi, the lockup piston functions normally for the aforementioned Chrysler transmissions in all respects and deflection and/or breakage of the lockup piston is completely eliminated. However, it will be appreciated by those skilled in the art that the stated fluid pressure range of 90–100 psi may be expanded to accommodate other transmission applications. Thus, the specified fluid pressure range of 90–100 psi is intended to be illustrative and not restrictive in any sense.

Figure 4:
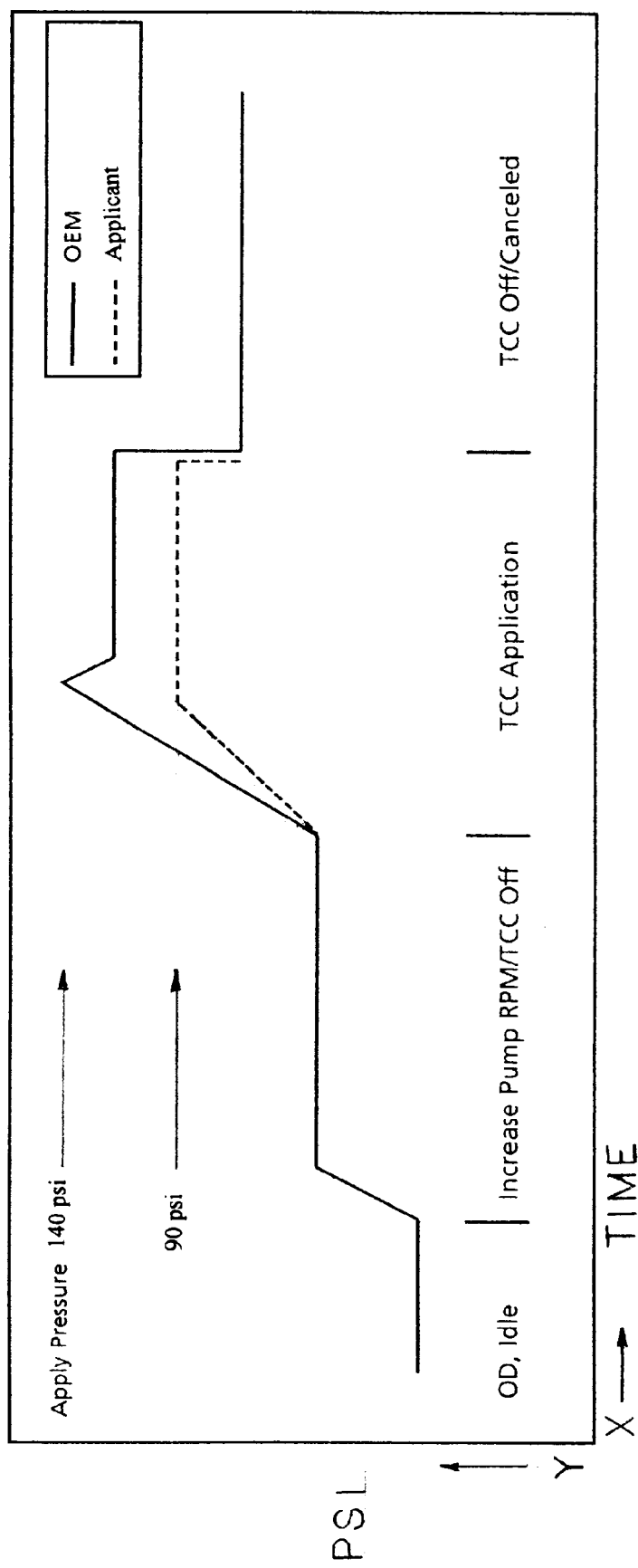
FIG. 4 is a graphic illustration of the initial apply pressure spike to the lockup piston in the original equipment manufacture TCCRV Assembly in comparison to the TCCRV Assembly of the present invention.

The difference in ATF pressure delivered via the TCC apply circuit 136 to the lockup piston in the TCCRV Assembly 100 of the prior art and the TCCRV Assembly 10 of the present invention is illustrated graphically in FIG. 4 wherein the X-axis represents time duration for a lockup cycle and the Y-axis represents pounds per square inch (psi).

Although not specifically illustrated in the drawings, it should be understood that additional equipment and structural components will be provided as necessary and that all of the components described above are arranged and supported in an appropriate fashion to form a complete and operative Torque Converter Clutch Regulator Valve Assembly incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claim be construed broadly and in a manner consistent with the scope of invention.

What is claimed is:

1. A torque converter clutch regulator valve assembly for use in regulating fluid pressure within the torque converter clutch apply circuit for regulating the lockup piston within the torque converter of an automatic transmission, said torque converter regulator valve assembly comprising:

a switch valve disposed within a bore in the valve body of the transmission, said switch valve including control lands formed at opposite ends thereof to regulate fluid flow supplied from the converter feed circuit into the clutch apply circuit, said switch valve further including a fluid restricting means for restricting fluid flow into the clutch apply circuit to a predetermined rate; and a bias valve disposed within the valve body in end-to-end relation to said switch valve, said bias valve including pressure reducing means for controlling fluid pressure within the clutch apply circuit to a predetermined pressure.

2. The torque converter clutch regulator valve assembly of claim 1 wherein said fluid restricting means includes a baffle integrally formed on said switch valve intermediate said control lands for restricting fluid flow into the clutch apply circuit.

3. The torque converter clutch regulator valve assembly of claim 2 wherein said baffle is cylindrical in configuration, said baffle being fabricated to a dimension calculated to constrict the bore surrounding said baffle to a predetermined cross-sectional area to delay fluid pressure buildup within the clutch apply circuit.

4. The torque converter clutch regulator valve assembly of claim 1 wherein said bias valve includes a valve piston, said valve piston being mechanically coupled to a bias valve cap defining an internal valve chamber therebetween.

5. The torque converter clutch regulator valve assembly of claim 4 wherein an internal pressure relief valve is disposed within said valve chamber in fluid communication with the apply balance circuit, said internal pressure relief valve being calibrated to reduce clutch apply circuit pressure responsive to a predetermined fluid pressure delivered to the apply balance circuit.

6. The torque converter clutch regulator valve assembly of claim 5 wherein said predetermined fluid pressure is in the range of 90 to 100 pounds per square inch.

7. An improved torque converter clutch regulator valve assembly for use in regulating fluid pressure within the torque converter clutch apply circuit for controlling the lockup piston in the torque converter of an automatic transmission, said torque converter clutch regulator valve assembly including a switch valve disposed within the valve body of the transmission and a bias valve disposed within the valve body in end-to-end relation to said switch valve, wherein the improvement comprises:

a modified switch valve disposed within the valve body of the transmission, said switch valve including fluid restricting means for restricting fluid flow into the clutch apply circuit to a predetermined rate; and a modified bias valve disposed within the valve body in end-to-end relation to said modified switch valve, said modified bias valve including pressure reducing means for controlling fluid pressure within the clutch apply circuit to a predetermined pressure.

8. The improved torque converter clutch regulator valve assembly of claim 7 wherein said fluid restricting means includes a baffle integrally formed on said switch valve for restricting fluid flow into the clutch apply circuit.

9. The improved torque converter clutch regulator valve assembly of claim 8 wherein said baffle is cylindrical in configuration, said baffle being fabricated to a dimension calculated to constrict the bore surrounding said baffle to a predetermined cross-sectional area to delay fluid pressure buildup within the clutch apply circuit.

10. The improved torque converter clutch regulator valve assembly of claim 7 wherein said bias valve includes a valve piston, said valve piston being mechanically coupled to a bias valve cap defining an internal valve chamber therebetween.

11. The improved torque converter clutch regulator valve assembly of claim 10 wherein an internal pressure relief valve is disposed within said valve chamber in fluid communication with the apply balance circuit, said pressure relief valve being calibrated to reduc apply circuit pressure responsive to a predetermined fluid pressure delivered to the apply balance circuit.

12. The improved torque converter clutch regulator valve assembly of claim 11 wherein said predetermined fluid pressure is in the range of 90 to 100 pounds per square inch.

13. A method of reducing hydraulic pressure within the torque converter clutch apply circuit in an automatic transmission, wherein fluid pressure within the apply circuit is regulated by a torque converter clutch regulator valve assembly disposed in fluid communication with the torque converter feed circuit and the torque converter clutch apply circuit of the transmission, said method comprising the steps of:

installing a replacement torque converter clutch regulator valve assembly including a modified switch valve and a modified bias valve in fluid communication with the torque converter feed circuit and the clutch apply circuit;

feeding hydraulic fluid from the converter feed circuit via said replacement torque converter clutch regulator valve assembly to the clutch apply circuit and to an associated apply balance circuit simultaneously; and reducing fluid pressure within the apply circuit responsive to a predetermined fluid pressure delivered to the apply balance circuit.

14. The method of claim 13 the step of reducing further includes the steps of:

integrating an internal pressure relief valve within said modified bias valve in fluid communication with the apply balance circuit; and diverting fluid pressure from the apply circuit to exhaust via said internal pressure relief valve responsive to a predetermined fluid pressure delivered to the apply balance circuit.

15. The method of claim 14 further including the step of:

delaying fluid pressure buildup within the apply circuit to prevent an initial fluid pressure spike at the start of each apply cycle.

16. The method of claim 15 wherein the step of delaying is carried out by a baffle formed on said modified switch valve, wherein said baffle is positioned in the path of fluid flowing from the torque converter feed circuit to the apply circuit.

* * * * *